United States Patent
Kittichokechai et al.

(10) Patent No.: US 12,238,707 B2
(45) Date of Patent: Feb. 25, 2025

(54) METHODS OF UPLINK TRANSMISSION CANCELLATION

(71) Applicant: Telefonaktiebolaget LM Ericsson (publ), Stockholm (SE)

(72) Inventors: Kittipong Kittichokechai, Järfälla (SE); Alexey Shapin, Lulea (SE); Mattias Andersson, Sundbyberg (SE); Ali Behravan, Stockholm (SE); Yufei Blankenship, Kildeer, IL (US); Sorour Falahati, Stockholm (SE); Jianwei Zhang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 57 days.

(21) Appl. No.: 17/766,658

(22) PCT Filed: Oct. 7, 2020

(86) PCT No.: PCT/EP2020/078111
§ 371 (c)(1),
(2) Date: Apr. 5, 2022

(87) PCT Pub. No.: WO2021/069488
PCT Pub. Date: Apr. 15, 2021

(65) Prior Publication Data
US 2024/0057072 A1 Feb. 15, 2024

Related U.S. Application Data

(60) Provisional application No. 62/911,548, filed on Oct. 7, 2019.

(51) Int. Cl.
*H04W 72/1268* (2023.01)
*H04W 72/232* (2023.01)
*H04W 72/566* (2023.01)

(52) U.S. Cl.
CPC ..... *H04W 72/1268* (2013.01); *H04W 72/232* (2023.01); *H04W 72/566* (2023.01)

(58) Field of Classification Search
CPC ............ H04W 72/232; H04W 72/566; H04W 72/1268
See application file for complete search history.

(56) References Cited

U.S. PATENT DOCUMENTS

2017/0289920 A1 10/2017 Liu et al.
2019/0098612 A1 3/2019 Babaei et al.
(Continued)

FOREIGN PATENT DOCUMENTS

| EP | 3547766 A1 | 10/2019 |
| KR | 20190098708 A | 8/2019 |
| TW | 201939997 A | 10/2019 |

OTHER PUBLICATIONS

3GPP TS 38.214 V15.6.0; 3rd Generation Partnership Project: Technical Specification Group Radio Access Network; NR; Physical layer procedures for data (Release 15); Jun. 2019; consisting of 105 pages.

(Continued)

*Primary Examiner* — Melanie Jagannathan
(74) *Attorney, Agent, or Firm* — Weisberg I.P. Law, P.A.

(57) ABSTRACT

A method, system and apparatus for uplink transmission cancellation are disclosed. According to one aspect, a method includes receiving a cancellation indication of uplink resources to be cancelled, determining protected uplink resources to be protected from cancellation, and cancelling transmissions on uplink resources indicated to be cancelled other than uplink resources determined to be protected from cancellation.

24 Claims, 10 Drawing Sheets

(A)

(B)

(56) References Cited

U.S. PATENT DOCUMENTS

| | | | |
|---|---|---|---|
| 2019/0254081 A1 | 8/2019 | Li et al. | |
| 2019/0306848 A1 | 10/2019 | Zhou et al. | |
| 2021/0112623 A1* | 4/2021 | Bae | H04W 8/24 |
| 2021/0176758 A1* | 6/2021 | Bae | H04L 1/1864 |
| 2021/0298117 A1* | 9/2021 | Zhou | H04W 76/36 |
| 2022/0312438 A1* | 9/2022 | Yi | H04W 72/1263 |
| 2023/0029903 A1* | 2/2023 | Singh | H04W 72/1268 |
| 2023/0123957 A1* | 4/2023 | Jung | H04L 1/08 370/329 |
| 2023/0188305 A1* | 6/2023 | Bagheri | H04L 5/0053 370/329 |
| 2023/0189260 A1* | 6/2023 | Bae | H04W 72/1268 370/329 |
| 2023/0217483 A1* | 7/2023 | Ye | H04L 5/0094 370/329 |
| 2024/0057072 A1* | 2/2024 | Kittichokechai | H04W 72/1268 |
| 2024/0073887 A1* | 2/2024 | Bae | H04W 72/21 |

OTHER PUBLICATIONS

3GPP TS 38.331 V15.6.0; 3rd Generation Partnership Project; Technical Specification Group Radio Access Network: NR; Radio Resource Control (RRC) protocol specification (Release 15); Jun. 2019; consisting 519 pages.

International Search Report and Written Opinion dated Dec. 18, 2020 for International Application No. PCT/EP2020/078111 filed Oct. 7, 2020, consisting of 13 pages.

International Preliminary Report on Patentability dated Jan. 12, 2022 for International Application No. PCT/EP2020/078111 filed Oct. 7, 2020, consisting of 19 pages.

3GPP TS 38.331 V15.6.0; 3rd Generation Partnership Project; Technical Specification Group Radio Access Network; NR; Radio Resource Control (RRC) protocol specification (Release 15); Jun. 2019; consisting of 519 pages.

3GPP TS 38.213 V15.6.0; 3rd Generation Partnership Project; Technical Specification Group Radio Access Network; NR; Physical layer procedures for control (Release 15); Jun. 2019; consisting of 107 pages.

Chinese Office Action and English summary dated Apr. 7, 2024 for Application No. 202210852993.X, consisting of 11 pages.

3GPP TSG RAN WG1 #98 R1-1909460; Title: Summary#1 of UL inter UE Tx prioritization/multiplexing; Source: vivo; Agenda Item: 7.2.6.5; Document for: Discussion and Decision; Location and Date: Prague, CZ, Aug. 26-30, 2019, consisting of 39 pages.

3GPP TSG RAN WG1 #98 R1- 1908868; Title: Discussion on UL inter UE Tx prioritization/multiplexing; Agenda item: 7.2.6.5; Source: CMCC; Document for: Discussion and Decision; Location and Date: Prague, CZ, Aug. 26-30, 2019, consisting of 10 pages.

\* cited by examiner

METHODS OF UPLINK TRANSMISSION CANCELLATION

CROSS-REFERENCE TO RELATED APPLICATIONS

This application is a Submission Under 35 U.S.C. § 371 for U.S. National Stage Patent Application of International Application No.: PCT/EP2020/078111, filed Oct. 7, 2020 entitled "METHODS OF UPLINK TRANSMISSION CANCELLATION," which claims priority to U.S. Provisional Application No. 62/911,548, filed Oct. 7, 2019, entitled "METHODS OF UPLINK TRANSMISSION CANCELLATION," the entireties of both of which are incorporated herein by reference.

FIELD

The present disclosure relates to wireless communications, and in particular, to uplink transmission cancellation.

BACKGROUND

Ultra-reliable and low latency communication (URLLC) is one of the main use cases of Fifth Generation (5G) New Radio (NR) under development by the Third Generation Partnership Project (3GPP). URLLC has strict requirements on transmission reliability and latency, i.e., 99.9999% reliability within 1 ms one-way latency. In NR Release 15 (Rel-15), several new features and enhancements were introduced to support these requirements. In 3GPP Rel-16, standardization work is focused on further enhancing URLLC system performance as well as ensuring reliable and efficient coexistent of URLLC and other NR use cases. One example scenario is when both enhanced mobile broadband (eMBB) and URLLC wireless devices (WDs) co-exist in the same wireless communication cell. Here, two approaches have been identified to support multiplexing and prioritization.

The first method is based on power control to increase the power of the URLLC to make it more resilient to interference from the eMBB user(s). 3GPP power control for 3GPP Rel-15 WDs are specified in section 7.1.1 of 3GPP Technical Standard (TS) 38.213. An advantage of this option is that it does not require any changes in the behavior of the eMBB WD. Hence, this approach works with 3GPP Rel-15 WDs. One disadvantage is that to guarantee the performance of the URLLC WD while being interfered by eMBB traffic, the WD's transmit power spectral density (PSD) may have to be increased significantly. But, for example, WDs not in the close vicinity of the base station may not have the power budget to perform this increase and will therefore experience much lower signal to interference plus noise ratio (SINR) than required.

The second method for supporting multiplexing and prioritization is based on a preemption indicator being transmitted from the network node, e.g., base station, to the interfering eMBB WDs. When a URLLC WD is scheduled on time and/or frequency resources that are already scheduled based on a lower priority eMBB WD, the network node can transmit a preemption indicator to the eMBB WD. Upon reception of this indicator, the eMBB WD will avoid transmitting on a set of preconfigured resources. The details of the preemption indicator and the WD behavior upon reception of this signal is currently being considered by the 3GPP. This indicator can point to one or more orthogonal frequency division multiplexed (OFDM) symbols, or to a set of resource elements. In some versions, there are several possible sets of OFDM symbols or sets of resource elements, and the indicator points to one or more of these sets.

Note that the term "preemption" (pre-emption) can be used as an alternative to the term "interruption" or "cancelation". All these terms may be used interchangeably in this disclosure.

A typical use case for such preemption or cancellation is when eMBB traffic is scheduled in a whole slot and all physical resource blocks (PRBs) and time sensitive URLLC need to be transmitted. Here, time sensitive means that instant access to the channel is required, and waiting until the next slot before transmission will introduce too much delay. In NR URLLC, traffic maybe be scheduled on one or a few OFDM symbols and with a significantly shorter time from the uplink grant to when the uplink transmission takes place. This means that eMBB users may already have been scheduled on all available time/frequency resources. With the preemption indicator, the network node (e.g., base station such as a gNB) can choose to preempt the eMBB traffic and hence reduce the interference to the URLLC WD.

One aspect of cancellation is what signal is cancelled using the indicator. The uplink cancellation may be used by the WD to cancel one or multiple of uplink (UL) channels, i.e., physical uplink shared channel (PUSCH), sounding reference signal (SRS), physical uplink control channel (PUCCH), and/or physical random access channel (PRACH).

Some different versions of which resources to avoid transmitting on have been discussed by the 3GPP. It may be difficult for a WD to change its transmission bandwidth during a transmission. Therefore, in some versions of cancellation indication, if a signal that can be canceled overlaps in time and frequency resources with the signaled resources that are to be canceled, the WD cancels transmissions on all of the OFDM symbols that are pointed to. Stopping a transmission and resuming it can lead to phase discontinuity of the signal. Therefore, in some versions the WD does not resume transmission even if the canceled signal occupies any resource elements in later OFDM symbols than the signaled set of resources. See FIG. 1 which shows examples of these two cancellation conditions (FIGS. 1(A) and (B)).

In the following, existing related concepts of downlink reserved resource and downlink control information (DCI) format 2_1 for downlink (DL) preemption indication are discussed.

Downlink Reserved Resource

In NR 3GPP Rel-15, some resources in the downlink (DL) can be defined as reserved resources where the physical downlink shared channel (PDSCH) scheduled to overlap with the reserved resources will be rate-matched. Reserved resources can be configured in many different ways. One of the most common way is to semi-statically configure resource sets, some of which can be further configured as reserved resources or can be dynamically indicated to be used as reserved resources.

In NR 3GPP Rel-15, a set of bitmaps is used to configure the resource set.

Bitmap-1 (described by a radio resource control (RRC) parameter, resourceBlocks) indicates the set of resource blocks (RB). The size of the bitmap-1 corresponds to the size of a bandwidth part (BWP).

Bitmap-2 (described by an RRC parameter symbolsInResourceBlock) indicates the set of OFDM symbols within the slot or within a pair of slots. The size of bitmap-2 is either 14 or 28.

Bitmap-3 indicates a time domain repetition pattern at which the pattern defined by Bitmap-1 and Bitmap-2 recurs in the number of slots. The size of Bitmap-3 can be up to 40 bits.

The resource set is defined as all resource blocks (RBs) with value '1' in Bitmap-1 and all OFDM symbols with value '1' in Bitmap-2 in all slots indicated by value '1' in Bitmap-3.

Up to 8 different resource sets can be configured. Further, the resource sets may be semi-statically configured to be used as reserved resources or be dynamically indicated by some of the sets to be used as reserved resources.

For the dynamic indication, up to two groups of resource sets (rateMatchPatternGroup1 and rateMatchPatternGroup2) can be configured, and a bitmap indicator (the rate matching indicator field with size up to two bits) in the scheduling assignment indicates one or both groups to be used as reserved resources.

Complete details for downlink reserve resources are given, for example, in TS 38.214, version V15.6.0, Section 5.1.4 and PDSCH-Config and RateMatchPattern, RateMatchPatternId, RateMatchPatternLTE-CRS information elements (IEs) in TS 38.331, V15.6.0.

Downlink Preemption Indication

In NR 3GPP Rel-15, downlink control information (DCI)) format 2_1 is used for notifying the physical resource blocks (PRB) and OFDM symbol(s) where the WD may assume no transmission is intended for the WD.

The following information is transmitted using the DCI format 2_1 with cyclic redundancy check (CRC) scrambled by INT-radio network temporary identifier (RNTI):

Pre-emption indication 1, Pre-emption indication 2, . . . , Pre-emption indication N.

The size of DCI format 2_1 is configurable by higher layers up to 126 bits, according to Subclause 11.2 of 3GPP TS 38.213, V.15.6.0. Each pre-emption indication is 14 bits.

In principle, the downlink (DL) preemption indication provides a length-14 bitmap to indicate in an OFDM symbol level whether the whole or part of the symbol is pre-empted. If the time-domain granularity is one OFDM symbol, the corresponding frequency domain granularity is the whole bandwidth part (BWP). If time domain granularity is two consecutive OFDM symbols, the corresponding frequency domain granularity is equal to half of the BWP size.

Upon receiving uplink (UL) cancellation, the WD cancels some UL transmissions within resources that are indicated by the cancellation indication. Moreover, such indication can be very coarse, e.g., all resource blocks in the frequency domain. The cancellation includes at least the physical uplink shared channel (PUSCH) and possibly other channels of the WD. It can be desirable to preserve some of the uplink transmissions from cancellation, e.g., uplink control, sounding reference signal (SRS), physical random access channel (PRACH) or data transmissions from some WDs in the cell. However, current solutions do not preserve some of the uplink transmissions from cancellation, e.g., uplink control, SRS, PRACH or data transmissions from some WDs in the cell.

SUMMARY

Some embodiments advantageously provide methods, network nodes and wireless devices for uplink transmission cancellation. Some embodiments, include methods of protecting wireless device (WD) signal transmissions when the WD receives a cancelation indicator, letting the WD ignore the cancelation indicator in special cases. Also, several alternatives to indicate cancelation indication without impacting certain uplink (UL) transmissions are described herein. Some methods help to minimize harmful effects of coarse granularity of the cancellation indication. As a result, information may be transmitted ignoring the cancellation indication, thereby improving spectral efficiency and quality of service (QoS) fulfillment.

In some embodiments, some of the uplink transmissions are preserved from cancellation. For example, the uplink control channel transmissions, sounding reference signal (SRS) transmissions, physical random access channel (PRACH) or data transmissions from some WDs in the cell may be protected from cancellation. This is in contrast to current solutions that do not preserve some of the uplink transmissions from cancellation, e.g., uplink control, SRS, PRACH or data transmissions from some WDs in the cell.

According to one aspect, a WD is configured to communicate with a network node, the WD comprising processing circuitry configured to receive a cancellation indication of uplink resources to be cancelled, determine protected uplink resources to be protected from cancellation, and cancel transmissions on uplink resources indicated to be cancelled other than uplink resources determined to be protected from cancellation.

According to this aspect, in some embodiments, the determined protected uplink resources are indicated by the cancellation indication. In some embodiments, the determined protected uplink resources are semi-statically configured. In some embodiments, the determined protected uplink resources include uplink resources for transmissions determined to be high priority transmissions. In some embodiments, the determined protected uplink resources include uplink resources for uplink control channel transmissions. In some embodiments, the determined protected uplink resources include uplink resources for random access channel transmissions. In some embodiments, the determined protected uplink resources do not include uplink resources for uplink shared channel transmissions. In some embodiments, the determined protected uplink resources do not include uplink resources for sounding reference signal transmissions.

According to another aspect, a method in a wireless device, WD, configured to communicate with a network node is provided. The method includes receiving a cancellation indication of uplink resources to be cancelled, determining protected uplink resources to be protected from cancellation, and cancelling transmissions on uplink resources indicated to be cancelled other than uplink resources determined to be protected from cancellation.

According to this aspect, the determined protected uplink resources are indicated by the cancellation indication. In some embodiments, the determined protected uplink resources are semi-statically configured. In some embodiments, the determined protected uplink resources include uplink resources for transmissions determined to be high priority transmissions. In some embodiments, the determined protected uplink resources include uplink resources for uplink control channel transmissions. In some embodiments, the determined protected uplink resources include uplink resources for random access channel transmissions. In some embodiments, the determined protected uplink resources do not include uplink resources for uplink shared channel transmissions. In some embodiments, the determined protected uplink resources do not include uplink resources for sounding reference signal transmissions.

According to yet another aspect, a network node is configured to communicate with a wireless device (WD).

The network node includes processing circuitry configured to designate uplink resources of the WD as protected resources, and a radio interface configured to transmit to the WD a protected resources indication indicating the protected resources.

According to this aspect, in some embodiments, the processing circuitry is further configured to designate uplink resources to be cancelled and the radio interface is further configured to transmit to the WD a cancellation indication of the uplink resources to be cancelled. In some embodiments, the cancellation indication is transmitted in downlink control information, DCI. In some embodiments, the protected resources indication is transmitted in downlink control information, DCI. In some embodiments, the protected resources indication is transmitted in a group common message to be received by WDs in a group. In some embodiments, the protected resources indication indicates time domain resources, but not frequency domain resources.

According to another aspect, a method in a network node configured to communicate with a wireless device (WD) is provided. The method includes designating uplink resources of the WD as protected resources, and transmitting to the WD a protected resources indication indicating the protected resources.

According to this aspect, in some embodiments, the method further includes designating uplink resources to be cancelled and the radio interface is further configured to transmit to the WD a cancellation indication of the uplink resources to be cancelled. In some embodiments, the cancellation indication is transmitted in downlink control information, DCI. In some embodiments, the protected resources indication is transmitted in downlink control information, DCI. In some embodiments, the protected resources indication is transmitted in a group common message to be received by WDs in a group. In some embodiments, the protected resources indication indicates time domain resources, but not frequency domain resources.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
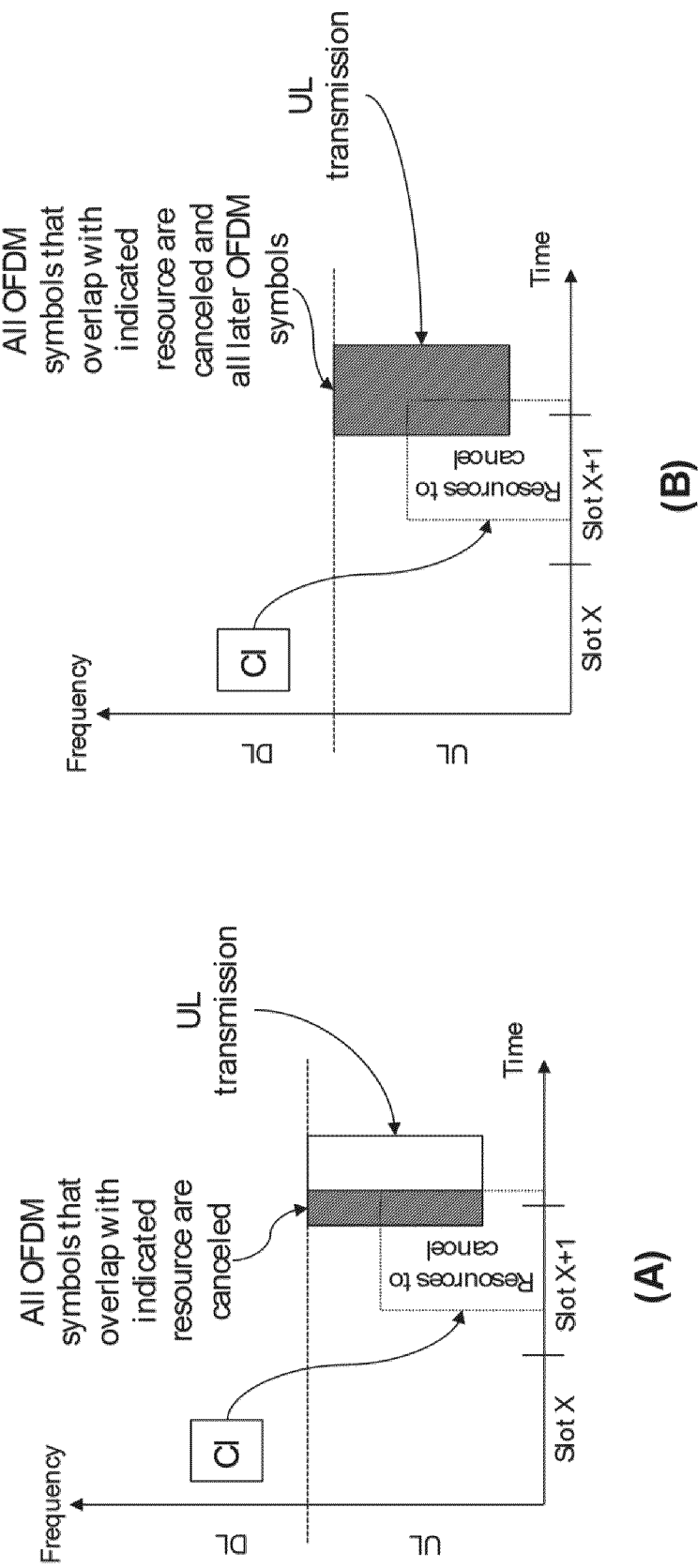
FIG. 1 illustrates transmission timing.

Before describing in detail exemplary embodiments, it is noted that the embodiments reside primarily in combinations of apparatus components and processing steps related to uplink transmission cancellation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide uplink transmission cancellation. According to one aspect, a method includes receiving an indication of uplink resources that are to be configured by the WD to be protected resources, determining a set of uplink resources to be protected from cancellation, and cancelling transmissions indicated to be transmitted on the protected resources except for transmissions on protected resources determined to be protected from cancellation.

Figure 2:
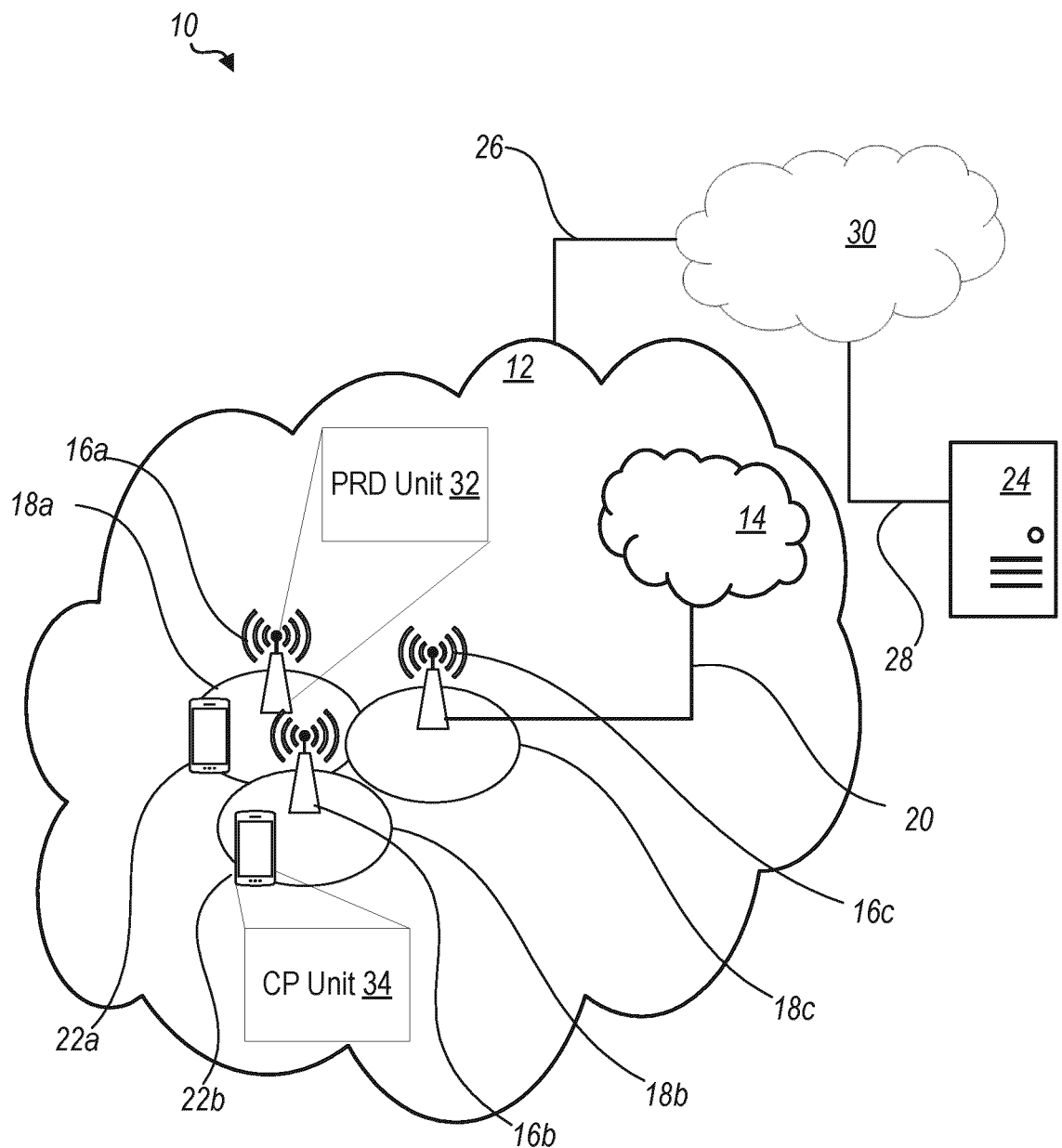
FIG. 2 is a schematic diagram of an exemplary network architecture illustrating a communication system connected via an intermediate network to a host computer according to the principles in the present disclosure.

Returning again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a protected resource designation (PRD) unit 32 which is configured to designate uplink resources of the WD as protected resources. A wireless device 22 is configured to include a cancellation protection (CP) unit 34 which is configured to cancel transmissions indicated to be transmitted on the protected resources except for transmissions on protected resources determined to be protected from cancellation.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include protected resource designation (PRD) unit 32 which is configured to designate uplink resources of the WD as protected resources.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include cancellation protection unit (CP) 34 which is configured to cancel transmissions indicated to be transmitted on the protected resources except for transmissions on protected resources determined to be protected from cancellation.

Figure 3:
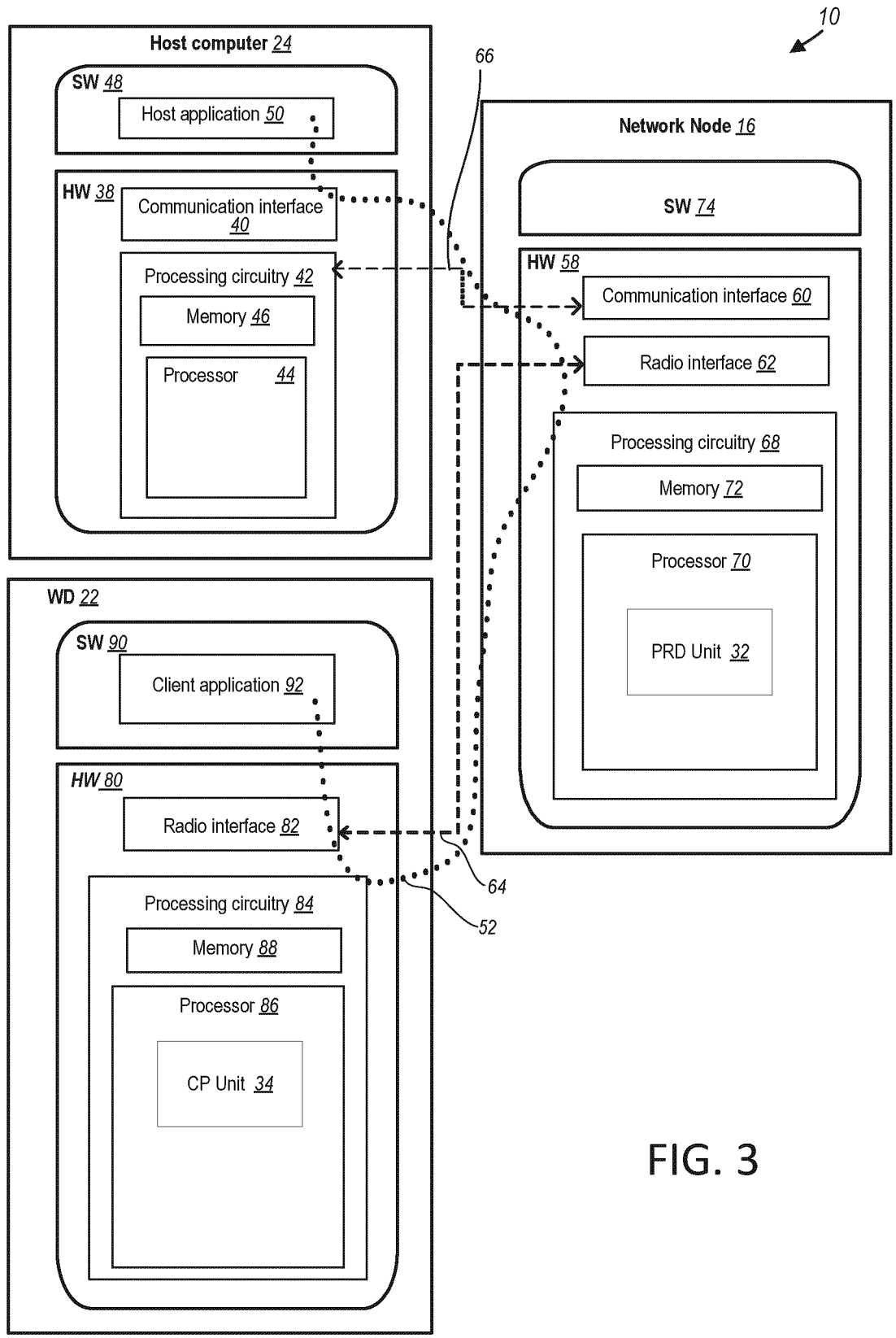
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices.

Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as protected resource designation unit (PRD) 32, and cancellation protection unit (CP) 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
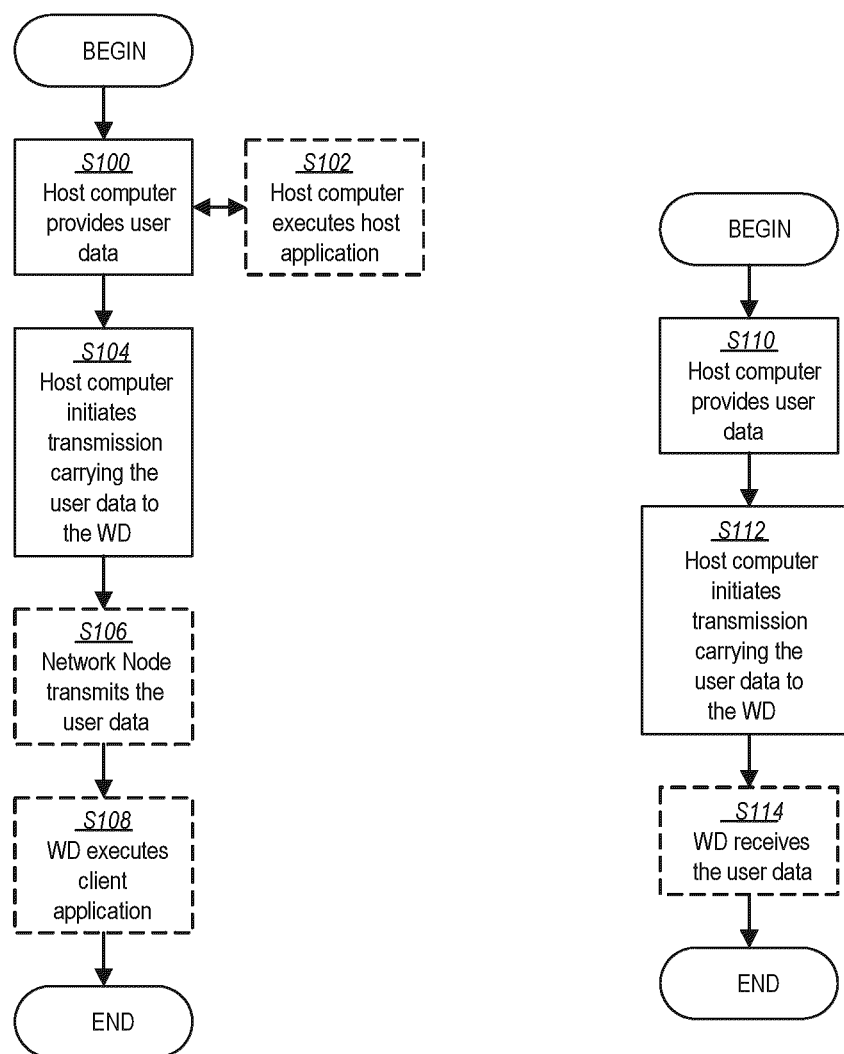
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
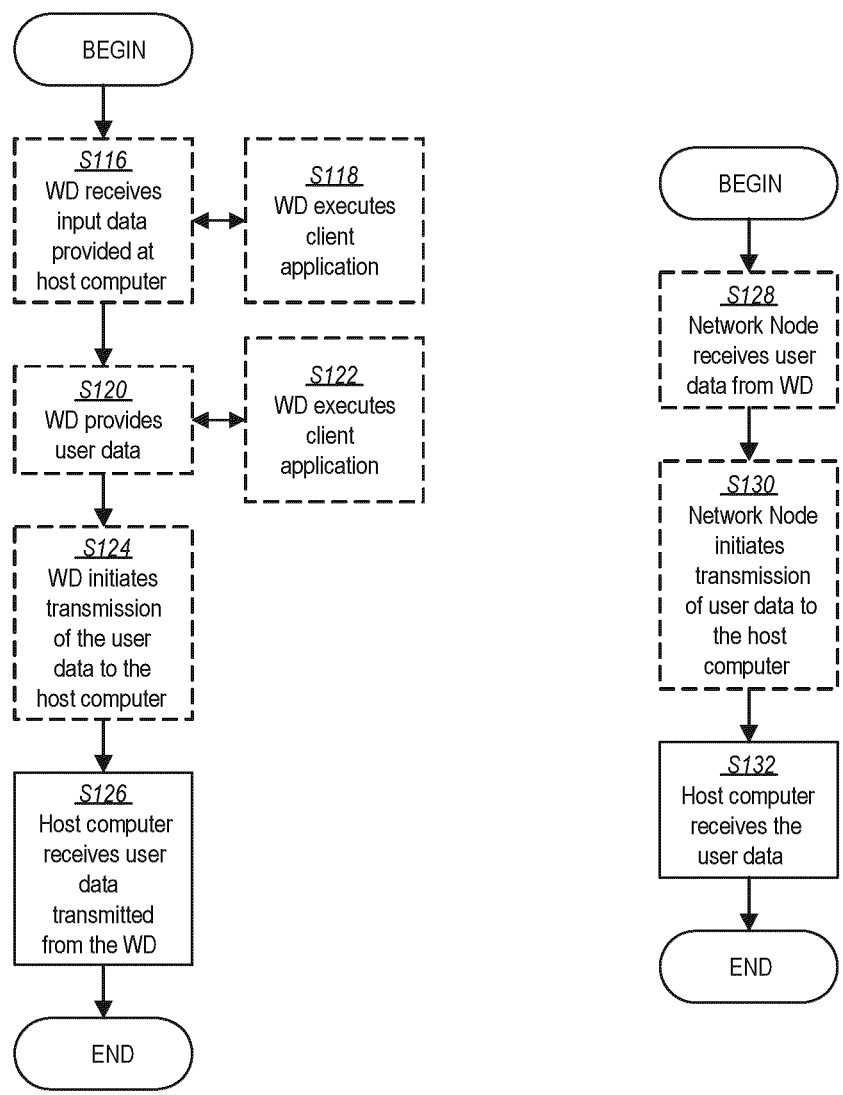
FIG. 6 is a flowchart illustrating exemplary methods implemented in a communication system including a host computer, a network node and a wireless device for receiving user data from the wireless device at a host computer according to some embodiments of the present disclosure.
FIG. 7 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
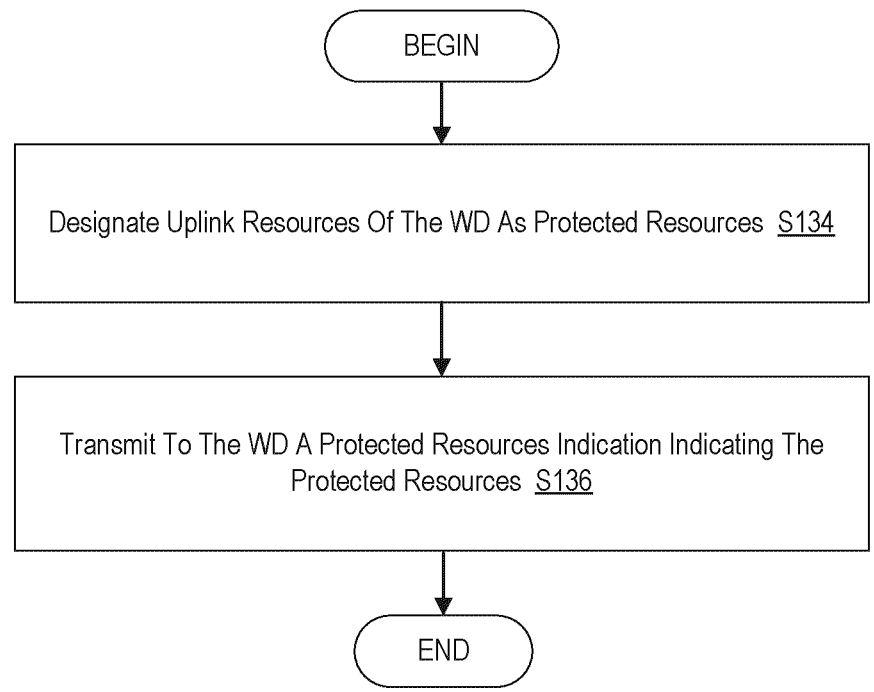
FIG. 8 is a flowchart of an exemplary process in a network node for uplink transmission cancellation.

FIG. 8 is a flowchart of an exemplary process in a network node 16 for uplink transmission cancellation. One or more blocks described herein may be performed by one or more elements of network node 16 such as by one or more of processing circuitry 68 (including the PRD unit 32), processor 70, radio interface 62 and/or communication interface 60. Network node 16 such as via processing circuitry 68 and/or processor 70 and/or radio interface 62 and/or communication interface 60 is configured to designate uplink resources of the WD as protected resources (Block S134). The process also includes transmitting to the WD a protected resources indication indicating the protected resources to the WD (Block S136).

Figure 9:
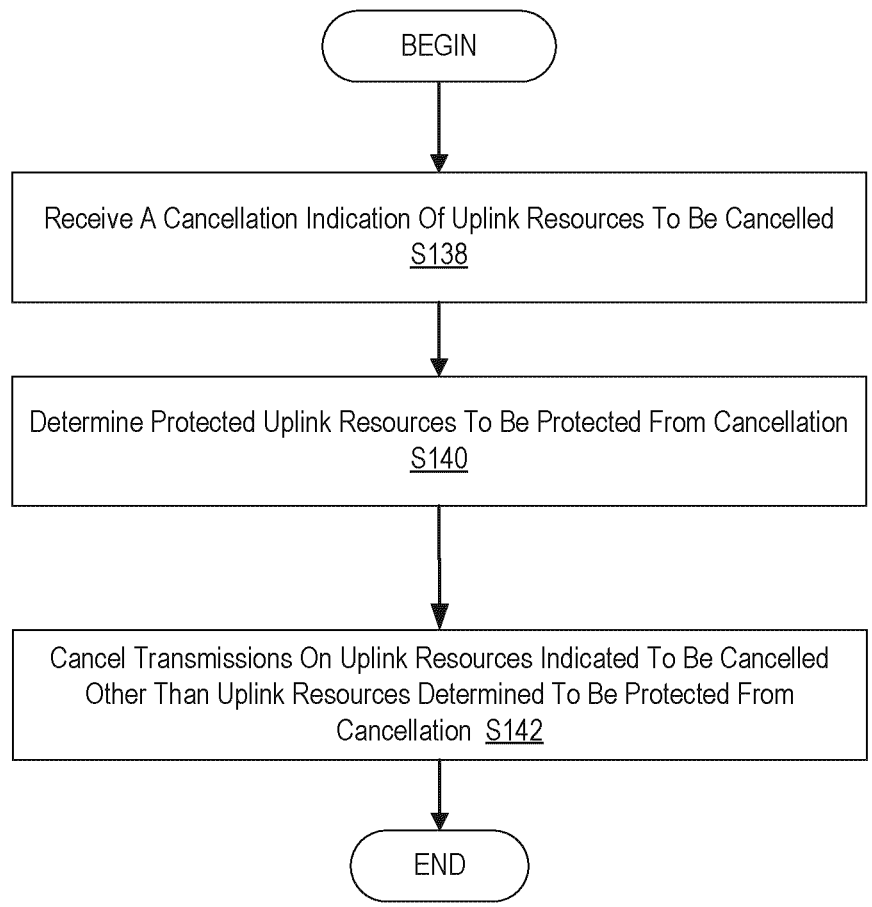
FIG. 9 is a flowchart of an exemplary process in a wireless device for uplink transmission cancellation.

FIG. 9 is a flowchart of an exemplary process in a wireless device 22 according to some embodiments of the present disclosure. One or more blocks described herein may be performed by one or more elements of wireless device 22 such as by one or more of processing circuitry 84 (including the CP unit 34), processor 86, radio interface 82 and/or communication interface 60. Wireless device 22 such as via processing circuitry 84 and/or processor 86 and/or radio interface 82 is configured to receive a cancellation indication of uplink resources to be cancelled (Block S138). The process also includes determining protected uplink resources to be protected from cancellation (Block S140). The process further includes cancelling transmissions on uplink resources indicated to be cancelled other than uplink resources determined to be protected from cancellation (Block S142).

Having described the general process flow of arrangements of the disclosure and having provided examples of hardware and software arrangements for implementing the processes and functions of the disclosure, the sections below provide details and examples of arrangements for uplink transmission cancellation.

Use Cases and General Description

In general, certain uplink time-frequency resources may be designated by the network node 16 as protected (or prioritized) uplink resources, where the certain uplink transmissions of the target WD 22 are protected or prioritized. The target WD 22 is the WD 22 that has been provided with the protected or prioritized resources. Throughout the following descriptions the terms "target WD 22", or "victim WD 22" may be used, in which case these terms refer to the WD 22 that receives an uplink (UL) cancellation indication and should cancel some of its UL transmission. Also, the term "aggressor WD 22" refers to a WD 22 that needs to use the resources for UL transmission, because of which the other victim WD 22 may have to cancel their UL transmission.

The certain uplink transmission may vary depending on the use cases.

In cases of cancellation indicator based inter-WD uplink pre-emption, the victim WD 22 may be provided with protected uplink resources, so that the victim WD 22 may transmit certain UL channels or signals other than PUSCH, when the certain UL channels or signals reside within the protected uplink resources. The certain UL channels or signals may include: PUCCH carrying hybrid automatic repeat request acknowledgement (HARQ-ACK), PUCCH carrying aperiodic channel state information (CSI), PRACH, etc.

In cases of cancellation indicator based inter-WD uplink pre-emption, the aggressor WD 22 may have protected uplink resources, so that the aggressor WD 22 may transmit its PUSCH that resides within the protected uplink resources, including dynamically scheduled PUSCH and/or UL configured grant scheduled PUSCH. The aggressor WD 22 may need to know its protected uplink resources, so that it has knowledge that its PUSCH transmission can be carried out, likely pre-empting a victim WD's PUSCH transmission. This avoids the confusion of identifying which WD 22 is allowed to be the aggressor WD 22 (which carries out its PUSCH transmission), and which WD(s) 22 are the victim WDs 22 (which are forced to cancel their PUSCH transmission).

In cases of power-control based inter-WD 22 uplink pre-emption, the aggressor WD 22 may be with protected uplink resources, so that the aggressor WD 22 may transmit, via radio interface 82, its PUSCH with increased power level, where the PUSCH resides within the protected uplink resources. The aggressor WD's PUSCH includes dynamically scheduled PUSCH and/or UL configured grant scheduled PUSCH. Similarly, this avoids the confusion of identifying which WD 22 is allowed to be the aggressor WD 22 (which carries out its PUSCH transmission with increased power level), and which WD(s) are the victim WDs (which carries out its PUSCH transmission at a normal power level). Here the increased power level may be compared to the normal power level, where the normal power level is used when inter-WD 22 uplink pre-emption is not a concern.

In cases of 3GPP Rel-16 enhanced PUSCH, certain implicit rules are used via a wireless device 22 to determine a PUSCH transmission in the time domain. For example, the WD 22 may determine if PUSCH transmission can be carried out (or alternatively, should not be carried out) in certain OFDM symbols when the PUSCH is repeated and/or segmented in the time domain. This is in contrast to the 3GPP Rel-15 PUSCH scheduling, where the WD 22 is explicitly provided with start and end symbols of the PUSCH transmission in a slot. For 3GPP Rel-16 enhanced PUSCH, the WD 22 can be provided with protected uplink resources, so that the WD 22 knows that it can use the resources within the protected uplink resource, i.e., no need to skip PUSCH transmission in the protected time-frequency resource. Other than PUSCH, the WD 22 may also transmit other uplink channels/signals in the protected time-frequency resource, for example, PUCCH, SRS, PRACH.

In cases of 3GPP Rel-16 UL intra-WD pre-emption where a WD 22 is scheduled and configured with overlapping resources for two UL transmissions (PUSCH, PUCCH containing SR, hybrid automatic repeat request-acknowledgement (HARQ-ACK), channel state information (CSI), etc.), the WD 22 can be provided by the network node 16 with an indication of protected resources. In such cases, the WD 22 cancels the UL transmission whose resources are not part of the protected resource. Resources being considered not part of the protected resource may include, for example:
1) resources not intersecting with the protected resource in time or frequency domains and/or
2) resources that are not a subset of the protected resource in time or frequency domains.

That is, the protected resource may be provided to the WD 22 to prioritize certain UL transmission.

The protected (or prioritized) resources can be provided to a WD 22 in at least following example ways:
  The protected (or prioritized) resources can be signaled in a WD 22-specific message. The message can be radio resource control (RRC) signaling, medium access control (MAC) control elements (CE), or a DCI.
  The protected (or prioritized) resources can be signaled in a group common message, where the group common message is to be received by multiple WDs. The group common message can be a broadcast RRC message, medium access control control element (MAC CE), or a group common DCI.

The protected (or prioritized) resources can include:
  Alternative 1. All frequency resources a WD 22 may use, within certain time domain resources. In this case, the indication of protected resources only needs the indication of the relevant time domain resources without an indication of frequency domain resources.
  a) All frequency resources that a WD 22 may use can be all PRBs in a bandwidth part (BWP), or all PRBs in a component carrier.
  Alternative 2. Certain frequency resources within in certain time domain resources. In this case, the indication of protected resources needs to include both the indication of the relevant time domain resources, and the indication of the relevant frequency domain resources.

More details are provided below.

Protected Uplink Resources

General Description

Figure 10:
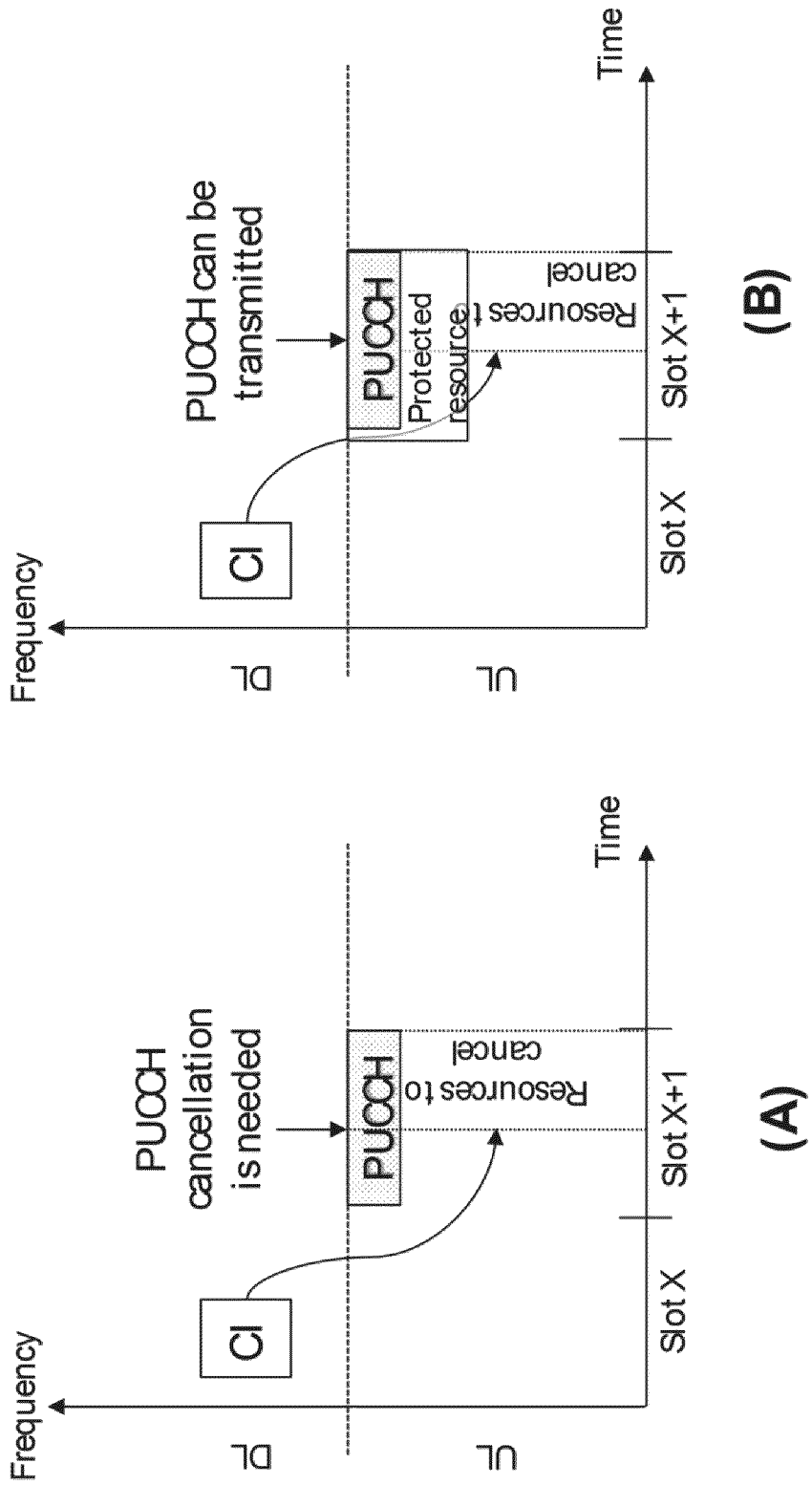
FIG. 10 illustrates cancellation timing.

A general idea of the method according to some embodiments is illustrated in FIG. 10. This method in some embodiments includes introduction of reserved UL resources, e.g., by semi-static configuration. When the WD 22 receives a cancellation indication, indicating an area in the UL time-frequency resources, if part of the indicated cancellation resources belongs to the reserved area, the reserved area is not included in the cancellation, i.e., any signal that is being sent in the reserved area is not cancelled.

FIG. 10 is an illustration of signal cancellation without protected resources (A) and with usage of protected resources (B) with a PUCCH signal as an example. In case (A), the WD 22 is scheduled to transmit PUCCH, upon detecting the control information (CI), cancels PUCCH since the PUCCH resources overlap with the resource-to-cancel as indicated in the CI. In case (B), the PUCCH resource is contained in the protected resource and is excluded from being canceled even if the CI indicates the resource-to-cancel area overlapping with the PUCCH resources.

Alternatively, the protection can be applied to a selected type of data/control/signal, i.e., if some specific control/data/signal are in the reserved (protected) area, then they can be cancelled while if there are other types of data/control/signal in the reserved (protected) area, they are not cancelled.

As one example, the rule can be such that if there is PUCCH in the reserved (protected) area, then upon receiving an UL cancellation indication, the WD 22 does not cancel the transmission of PUCCH in the protected area. On the other hand, if there is an SRS transmission in the protected area, then upon receiving a UL cancellation indication, the WD 22 cancels SRS transmission, disregarding the fact that SRS can be fully or partially in the reserved (protected) area.

Configuration of Protected Resources

In one non-limiting embodiment, one or more protected resource sets are semi-statically configured in higher layers (RRC).

In one non-limiting embodiment, one or more protected resource sets are configured to belong to a protected resource group. In other words, grouping of sets is applied.

In one non-limiting embodiment, a set of one or more bitmaps are used to indicate time and frequency domain resources of a protected resource set.

Figure 11:
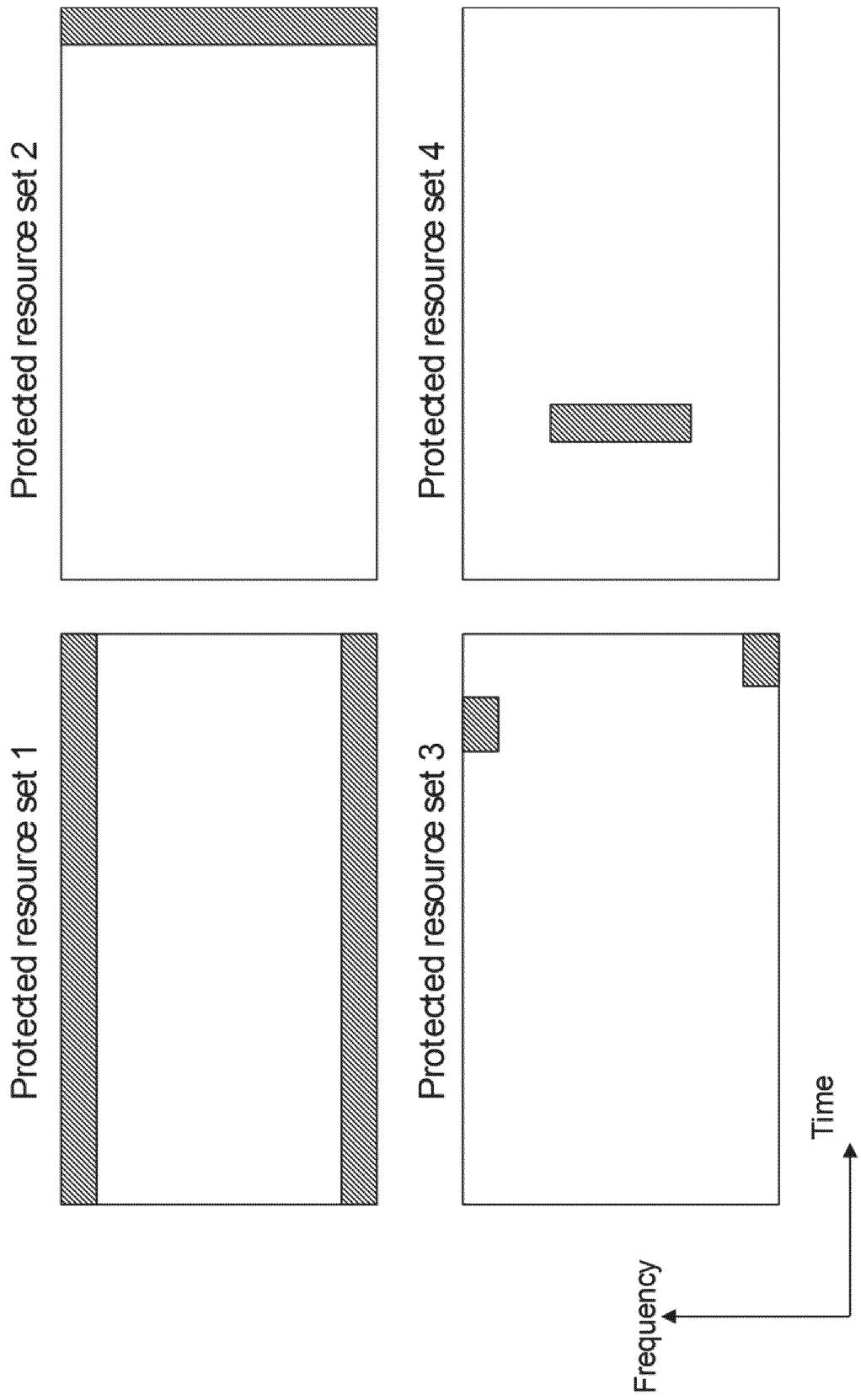
FIG. 11 illustrates an example of protected resource configurations.

FIG. 11 illustrates an example of protected resource sets consisting of time- and frequency-domain resources in the highlighted areas. For example, parts of the bandwidth part edge (one or two PRBs at both ends) are configured as protected resources.

Figure 12:
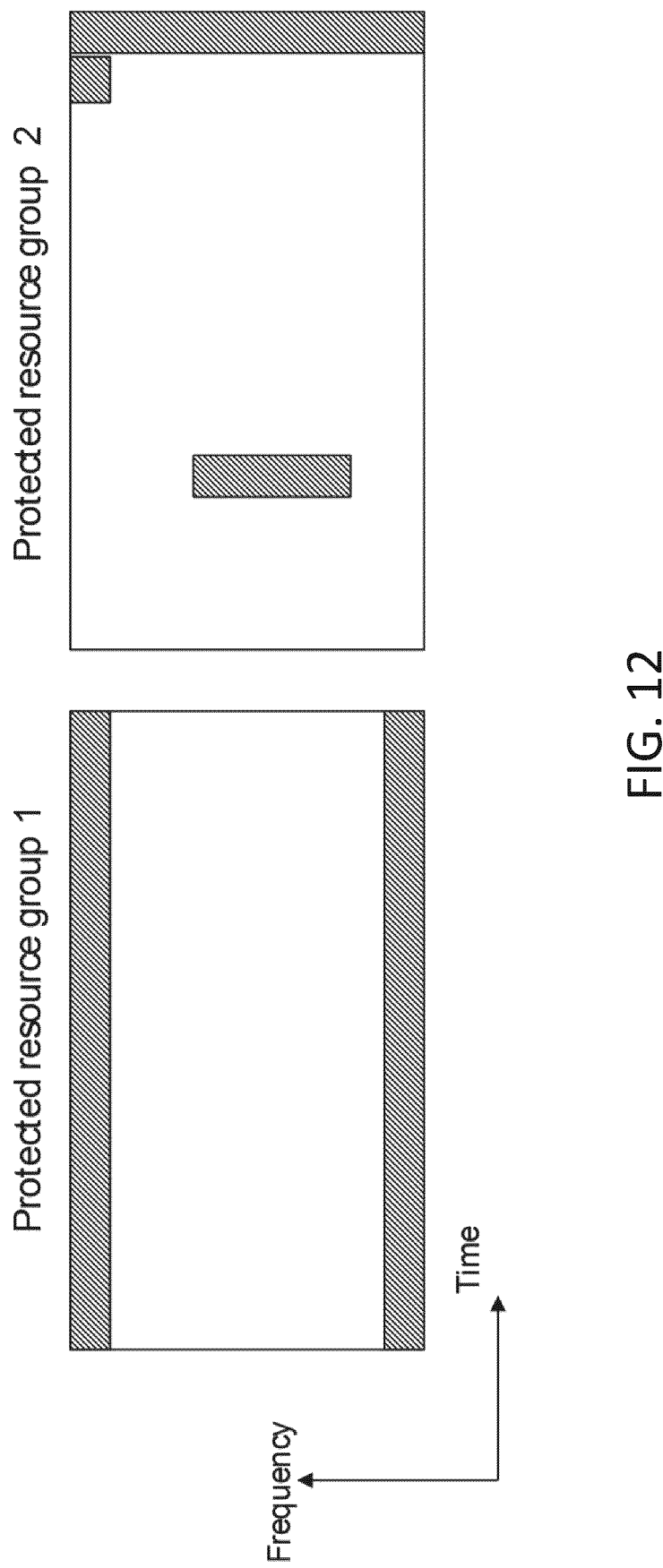
FIG. 12 illustrates another example of protected resource configurations.

FIG. 12 illustrates that in one example, one or more of the protected resource sets (for example as shown in FIG. 11) can be further configured to belong to a protected resource group, e.g., protected resource set 1 belongs to protected resource group 1, while protected resource set 2, 3 and 4 belong to protected resource group 2.

Semi-Static Activation of Protected Resources

In one non-limiting embodiment, one or more resource sets among the configured protected resource sets or protected resource groups are semi-statically activated as the protected resource.

Dynamic Indication of Protected Resources

In one non-limiting embodiment, one or more resource sets among the configured protected resource sets are indicated by a field in the ULcancelation indication DCI. For example, if there are 4 protected resource sets configured, 2 bits may be used to indicate one protected resource set. Alternatively, a bitmap of length of 4 may be used to indicate which protected resource sets are considered as part of the protected resources.

Similarly, one or more resource groups among the configured protected resource groups may be indicated by a field in the ULcancelation indication DCI.

Which UL Transmissions/Signals should be Protected?

Semi-Static Indication of Protected UL Transmissions

In one non-limiting embodiment, certain UL transmissions are semi-statically configured to be protected from cancelation. Upon receiving an UL cancelation indication, if the WD 22 has another UL transmission belonging to the configured protected UL transmission set, the WD 22 transmits that UL transmission even if the UL cancelation indication indicates the cancelation resources which overlap with that UL transmission.

An example of UL transmissions to be configured for protected transmission include PUCCH, PRACH, SRS, etc. In some versions of this embodiment, only certain specific UL transmission is considered, e.g., PUCCH carrying HARQ-ACK.

Dynamic Indication of Protected UL Transmissions

In one non-limiting embodiment, a field indicating certain protected transmissions is included in the UL cancelation indication DCI.

In some version of the above embodiment, the field points to one or more of the configured UL transmissions to be considered protected. For example, if there are PUCCH carrying HARQ-ACK and PRACH are configured, a one or two-bit field can be used to indicate that one or both of the UL transmissions are considered protected.

Upon receiving an UL cancelation indication, if the WD 22 has another UL transmission belonging to the configured protected UL transmission set, the WD 22 transmits that UL transmission even if the UL cancelation indication indicates the cancelation resources which overlap with that UL transmission.

UL Cancelation Indication Based on Configured Set of Cancelation Resources

Another way of indicating transmission protections can be more precise signaling of cancelation indication based on a configured set of cancelation resources.

Resource Described by Consecutive RBs and OFDM Symbols

In one non-limiting embodiment, an UL cancelation indication contains a field pointing to indices of one or more sets of semi-statically configured resources (a set of consecutive RBs and OFDM symbols). The union of the indicated sets are considered to be the overall cancelation resource for the WD 22.

In one non-limiting embodiment, different semi-statically configured resource sets can overlap in time or frequency. In one non-limiting embodiment, a WD 22, upon receiving an UL cancelation indication, cancels all UL transmission whose resources partially overlap with the resource indicated by the UL cancelation indication.

Resource Described by Single Resource Element

In one non-limiting embodiment, a set of different resource elements in the BWP are semi-statically configured. In one non-limiting embodiment, an UL cancelation indication contains a field pointing to one or more semi-statically configured resource elements (REs). In one non-limiting embodiment, a WD 22, upon receiving an UL cancelation indication, cancels all UL transmission whose resources contains the REs indicated by the UL cancelation indication.

Implicit Indication of Reserved Resources

In one non-limiting embodiment, the sets of resources that can be indicated in a cancellation indication to be cancelled is configurable so as to enable protection of some signals. In one non-limiting embodiment, the sets of resources that can be indicated in a cancellation indication to be canceled do not include the PRBs at the edge of the BWP or carrier. This allows the network node 16 to schedule e.g. PUCCH in these PRBs without canceling it. In one non-limiting embodiment the cancellation indication set of resources are similar to the sets of resources signaled by the preemption indicator, which cover one OFDM symbol and the full bandwidth, or two OFDM symbols and half the bandwidth. The difference is that the cancelation indicator excludes a set of PRBs at one or both edges of the BWP or carrier, and the number of PRBs can be configured.

According to one aspect, a WD 22 is configured to communicate with a network node 16, the WD 22 comprising processing circuitry 84 configured to receive a cancellation indication of uplink resources to be cancelled, determine protected uplink resources to be protected from cancellation, and cancel transmissions on uplink resources indicated to be cancelled other than uplink resources determined to be protected from cancellation.

According to this aspect, in some embodiments, the determined protected uplink resources are indicated by the cancellation indication. In some embodiments, the determined protected uplink resources are semi-statically configured. In some embodiments, the determined protected uplink resources include uplink resources for transmissions determined to be high priority transmissions. In some embodiments, the determined protected uplink resources include uplink resources for uplink control channel transmissions. In some embodiments, the determined protected uplink resources include uplink resources for random access channel transmissions. In some embodiments, the determined protected uplink resources do not include uplink resources for uplink shared channel transmissions. In some embodiments, the determined protected uplink resources do not include uplink resources for sounding reference signal transmissions.

According to another aspect, a method in a wireless device, WD 22, configured to communicate with a network node 16 is provided. The method includes receiving a cancellation indication of uplink resources to be cancelled, determining protected uplink resources to be protected from cancellation, and cancelling transmissions on uplink resources indicated to be cancelled other than uplink resources determined to be protected from cancellation.

According to this aspect, the determined protected uplink resources are indicated by the cancellation indication. In some embodiments, the determined protected uplink resources are semi-statically configured. In some embodiments, the determined protected uplink resources include uplink resources for transmissions determined to be high priority transmissions. In some embodiments, the determined protected uplink resources include uplink resources for uplink control channel transmissions. In some embodiments, the determined protected uplink resources include uplink resources for random access channel transmissions. In some embodiments, the determined protected uplink resources do not include uplink resources for uplink shared channel transmissions. In some embodiments, the determined protected uplink resources do not include uplink resources for sounding reference signal transmissions.

According to yet another aspect, a network node 16 is configured to communicate with a wireless device (WD) 22. The network node 16 includes processing circuitry 68 configured to designate uplink resources of the WD 22 as protected resources, and a radio interface 62 configured to transmit to the WD 22 a protected resources indication indicating the protected resources.

According to this aspect, in some embodiments, the processing circuitry 68 is further configured to designate uplink resources to be cancelled and the radio interface is further configured to transmit to the WD 22 a cancellation indication of the uplink resources to be cancelled. In some embodiments, the cancellation indication is transmitted in downlink control information, DCI. In some embodiments, the protected resources indication is transmitted in downlink control information, DCI. In some embodiments, the protected resources indication is transmitted in a group common message to be received by WDs 22 in a group. In some embodiments, the protected resources indication indicates time domain resources, but not frequency domain resources.

According to another aspect, a method in a network node 16 configured to communicate with a wireless device (WD) 22 is provided. The method includes designating uplink resources of the WD 22 as protected resources, and transmitting to the WD 22 a protected resources indication indicating the protected resources.

According to this aspect, in some embodiments, the method further includes designating uplink resources to be cancelled and the radio interface is further configured to transmit to the WD 22 a cancellation indication of the uplink resources to be cancelled. In some embodiments, the cancellation indication is transmitted in downlink control information, DCI. In some embodiments, the protected resources indication is transmitted in downlink control information, DCI. In some embodiments, the protected resources indication is transmitted in a group common message to be received by WDs 22 in a group. In some embodiments, the protected resources indication indicates time domain resources, but not frequency domain resources.

In one non-limiting embodiment, the sets of resources that can be indicated in a cancellation indication to be canceled overlap in time and frequency. This may allow the network node 16 the choice of more than one set to signal to cancel a transmission, and could protect other signals by choosing a set that does not overlap with the protected signal. In one nonlimiting embodiment, the implicit indication of reserved resources above are used together with a cancelation mechanism that cancels all.

According to one aspect, a network node 16 is configured to communicate with a wireless device (WD 22), the network node 16 including a radio interface 62 and/or processing circuitry 68 configured to designate uplink resources of the WD 22 as protected resources, and transmit an indication of the protected resources to the WD 22.

According to this aspect, in some embodiments, a set of bitmaps is used to indicate the protected resources. In some embodiments, designating uplink resources includes determining, via the processing circuitry 68, a set of uplink resources to be protected from cancellation.

According to another aspect, a method implemented in a network node 16 includes designating, for example via the processing circuitry 68, uplink resources of the WD 22 as protected resources, and transmitting an indication of the protected resources to the WD 22.

According to this aspect, in some embodiments, a set of bitmaps is used to indicate the protected resources. In some embodiments, designating uplink resources includes determining, via the processing circuitry 68, a set of uplink resources to be protected from cancellation.

According to yet another aspect, a wireless device (WD 22) configured to communicate with a network node 16 includes a radio interface 82 and/or processing circuitry 84 configured to receive an indication of uplink resources that are to be configured by the WD 22 to be protected resources, determine a set of uplink resources to be protected from cancellation; and cancel transmissions indicated to be transmitted on the protected resources except for transmissions on protected resources determined to be protected from cancellation.

According to this aspect, in some embodiments, the protected resources determined, via for example the processing circuitry 84, to be protected from cancellation are indicated by the indication. In some embodiments, the protected resources determined to be protected from cancellation are semi-statically configured.

According to another aspect, a method implemented in a wireless device (WD 22) includes receiving, via the radio interface 82, an indication of uplink resources that are to be configured by the WD 22 to be protected resources, determining a set of uplink resources to be protected from cancellation, and cancelling transmissions indicated to be transmitted on the protected resources except for transmissions on protected resources determined to be protected from cancellation.

According to this aspect, in some embodiments, the protected resources determined, via the processing circuitry 84, to be protected from cancellation are indicated by the indication. In some embodiments, the protected resources determined to be protected from cancellation are semi-statically configured.

Some embodiments include the following:

Embodiment A1. A network node configured to communicate with a wireless device (WD), the network node configured to, and/or comprising a radio interface and/or comprising processing circuitry configured to:
  designate uplink resources of the WD as protected resources; and
  transmit an indication of the protected resources to the WD.

Embodiment A2. The network node of Embodiment A1, wherein a set of bitmaps is used to indicate the protected resources.

Embodiment A3. The network node of Embodiment A1, wherein designating uplink resources includes determining a set of uplink resources to be protected from cancellation.

Embodiment B1. A method implemented in a network node, the method comprising:
  designating uplink resources of the WD as protected resources; and
  transmitting an indication of the protected resources to the WD.

Embodiment B2. The method of Embodiment B1, wherein a set of bitmaps is used to indicate the protected resources.

Embodiment B3. The method of Embodiment B1, wherein designating uplink resources includes determining a set of uplink resources to be protected from cancellation.

Embodiment C1. A wireless device (WD) configured to communicate with a network node, the WD configured to, and/or comprising a radio interface and/or processing circuitry configured to:
  receive an indication of uplink resources that are to be configured by the WD to be protected resources;
  determine a set of uplink resources to be protected from cancellation; and
  cancel transmissions indicated to be transmitted on the protected resources except for transmissions on protected resources determined to be protected from cancellation.

Embodiment C2. The WD of Embodiment C1, wherein the protected resources determined to be protected from cancellation are indicated by the indication.

Embodiment C3. The WD of Embodiment C1, wherein the protected resources determined to be protected from cancellation are semi-statically configured.

Embodiment D1. A method implemented in a wireless device (WD), the method comprising:
  receiving an indication of uplink resources that are to be configured by the WD to be protected resources;
  determining a set of uplink resources to be protected from cancellation; and
  cancelling transmissions indicated to be transmitted on the protected resources except for transmissions on protected resources determined to be protected from cancellation.

Embodiment D2. The method of Embodiment D1, wherein the protected resources determined to be protected from cancellation are indicated by the indication.

Embodiment D3. The method of Embodiment D1, wherein the protected resources determined to be protected from cancellation are semi-statically configured.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CSI | Channel State Information |
| HARQ-ACK | Hybrid Automatic Repeat Request Acknowledgement |
| PUCCH | Physical uplink control channel |
| PUSCH | Physical uplink shared channel |
| SR | Scheduling Request |
| UCI | Uplink Control Information |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device (WD), configured to communicate with a network node, the WD comprising processing circuitry configured to:
   receive a cancellation indication of uplink resources to be cancelled;
   determine protected uplink resources to be protected from cancellation, the determined protected uplink resources including uplink resources for uplink control channel transmissions, the determined protected uplink resources being indicated by the cancellation indication; and
   cancel transmissions on uplink resources indicated to be cancelled other than the determined protected uplink resources, the uplink resources for uplink control channel transmissions being excluded from being canceled even if the cancellation indication indicates that the resources to be cancelled are overlapping with the uplink resources for uplink control channel transmissions.

2. The WD of claim 1, wherein the determined protected uplink resources are semi-statically configured.

3. The WD of claim 1, wherein the determined protected uplink resources include uplink resources for transmissions determined to be high priority transmissions.

4. The WD of claim 1, wherein the determined protected uplink resources include uplink resources for random access channel transmissions.

5. The WD of claim 1, wherein the determined protected uplink resources do not include uplink resources for uplink shared channel transmissions.

6. The WD of claim 1, wherein the determined protected uplink resources do not include uplink resources for sounding reference signal transmissions.

7. A method in a wireless device (WD), configured to communicate with a network node, the method comprising:
   receiving a cancellation indication of uplink resources to be cancelled;
   determining protected uplink resources to be protected from cancellation, the determined protected uplink resources including uplink resources for uplink control channel transmissions, the determined protected uplink resources being indicated by the cancellation indication; and
   cancelling transmissions on uplink resources indicated to be cancelled other than the determined protected uplink resources, the uplink resources for uplink control channel transmissions being excluded from being canceled even if the cancellation indication indicates that the resources to be cancelled are overlapping with the uplink resources for uplink control channel transmissions.

8. The method of claim 7, wherein the determined protected uplink resources are semi-statically configured.

9. The method of claim 7, wherein the determined protected uplink resources include uplink resources for transmissions determined to be high priority transmissions.

10. The method of claim 7, wherein the determined protected uplink resources include uplink resources for random access channel transmissions.

11. The method of claim 7, wherein the determined protected uplink resources do not include uplink resources for uplink shared channel transmissions.

12. The method of claim 7, wherein the determined protected uplink resources do not include uplink resources for sounding reference signal transmissions.

13. A network node configured to communicate with a wireless device (WD), the network node comprising:
   processing circuitry configured to designate uplink resources of the WD as protected uplink resources, the protected uplink resources including uplink resources for uplink control channel transmissions, the protected uplink resources being indicated by a cancellation indication; and
   a radio interface configured to transmit to the WD a protected resources indication indicating the protected uplink resources, the uplink resources for uplink control channel transmissions being excluded from being canceled even if the cancellation indication indicates that the resources to be cancelled are overlapping with the uplink resources for uplink control channel transmissions.

14. The network node of claim 13, wherein the processing circuitry is further configured to designate uplink resources to be cancelled and the radio interface is further configured to transmit to the WD a cancellation indication of the uplink resources to be cancelled.

15. The network node of claim 14, wherein the cancellation indication is transmitted in downlink control information (DCI).

16. The network node of claim 13, wherein the protected resources indication is transmitted in downlink control information (DCI).

17. The network node of claim 13, wherein the protected resources indication is transmitted in a group common message to be received by WDs in a group.

18. The network node of claim 13, wherein the protected resources indication indicates time domain resources, but not frequency domain resources.

19. A method in a network node configured to communicate with a wireless device (WD), the method comprising:

designating uplink resources of the WD as protected uplink resources, the protected uplink resources including uplink resources for uplink control channel transmissions, the protected uplink resources being indicated by a cancellation indication; and transmitting to the WD a protected resources indication indicating the protected uplink resources, the uplink resources for uplink control channel transmissions being excluded from being canceled even if the cancellation indication indicates that the resources to be cancelled are overlapping with the uplink resources for uplink control channel transmissions.

20. The method of claim 19, further comprising designating uplink resources to be cancelled and the radio interface is further configured to transmit to the WD a cancellation indication of the uplink resources to be cancelled.

21. The method of claim 20, wherein the cancellation indication is transmitted in downlink control information (DCI).

22. The method of claim 19, wherein the protected resources indication is transmitted in downlink control information (DCI).

23. The method of claim 19, wherein the protected resources indication is transmitted in a group common message to be received by WDs in a group.

24. The method of claim 19, wherein the protected resources indication indicates time domain resources, but not frequency domain resources.

* * * * *